(12) United States Patent
Baxter et al.

(10) Patent No.: US 8,199,024 B2
(45) Date of Patent: Jun. 12, 2012

(54) LOW-VOLTAGE CONNECTION WITH SAFETY CIRCUIT AND METHOD FOR DETERMINING PROPER CONNECTION POLARITY

(75) Inventors: Jeffrey Baxter, Hillsboro, OR (US);
Brent Baxter, Hillsboro, OR (US);
Michael Baxter, Hillsboro, OR (US);
Ted Holbrook, Gresham, OR (US)

(73) Assignee: Energy Safe Technologies, Inc., Great Neck, NY (US)

( * ) Notice: Subject to any disclaimer, the term of this patent is extended or adjusted under 35 U.S.C. 154(b) by 392 days.

(21) Appl. No.: 12/559,357

(22) Filed: Sep. 14, 2009

(65) Prior Publication Data
US 2010/0283623 A1    Nov. 11, 2010

Related U.S. Application Data

(60) Provisional application No. 61/175,696, filed on May 5, 2009, provisional application No. 61/118,511, filed on Nov. 28, 2008.

(51) Int. Cl.
*G08B 21/00* (2006.01)
(52) U.S. Cl. ........................................ 340/687
(58) Field of Classification Search .................. 340/687, 340/636.1, 636.12, 636.2; 361/93.9, 101
See application file for complete search history.

(56) References Cited

U.S. PATENT DOCUMENTS

| | | | |
|---|---|---|---|
| 4,163,134 A | 7/1979 | Budrose | |
| 4,217,534 A | 8/1980 | Cole | |
| 4,272,142 A | 6/1981 | Zapf | |
| 4,447,785 A * | 5/1984 | Wright | 320/105 |
| 4,489,223 A | 12/1984 | Puckett et al. | |
| 4,663,579 A | 5/1987 | Yang | |
| 4,769,586 A | 9/1988 | Kazmierowicz | |
| 4,871,957 A * | 10/1989 | Taranto et al. | 320/105 |
| 5,189,359 A | 2/1993 | Kronberg | |
| 5,635,817 A * | 6/1997 | Shiska | 320/105 |
| 5,795,182 A | 8/1998 | Jacob | |
| 5,796,255 A * | 8/1998 | McGowan | 324/429 |
| 6,212,054 B1 * | 4/2001 | Chan | 361/170 |
| 6,239,515 B1 * | 5/2001 | Mackel et al. | 307/127 |
| 6,803,743 B2 * | 10/2004 | George et al. | 320/105 |
| 7,345,450 B2 | 3/2008 | Krieger et al. | |
| 2002/0155752 A1 | 10/2002 | Winkle et al. | |
| 2006/0145655 A1 | 7/2006 | Sheng | |

FOREIGN PATENT DOCUMENTS
DE   200520005238 U   6/2005
* cited by examiner

*Primary Examiner* — Phung Nguyen
(74) *Attorney, Agent, or Firm* — Michael F. Krieger; Kirton McConkie

(57) ABSTRACT

A safety circuit used in low-voltage connecting systems leaves the two low-voltage systems disconnected until it determines that it is safe to make a connection. When the safety circuit determines that no unsafe conditions exist and that it is safe to connect the two low-voltage systems, the safety circuit may connect the two systems by way of a "soft start" that provides a connection between the two systems over a period of time that reduces or prevents inductive voltage spikes on one or more of the low-voltage systems. When one of the low-voltage systems has a completely-discharged battery incorporated into it, a method is used for detection of proper polarity of the connections between the low-voltage systems. The polarity of the discharged battery is determined by passing one or more test currents through it and determining whether a corresponding voltage rise is observed.

20 Claims, 17 Drawing Sheets

*Single test current direction*

*Bi-directional test current direction*

US 8,199,024 B2

LOW-VOLTAGE CONNECTION WITH SAFETY CIRCUIT AND METHOD FOR DETERMINING PROPER CONNECTION POLARITY

CROSS-REFERENCE TO RELATED APPLICATIONS

This application claims the benefit of U.S. Provisional Application No. 61/175,696, filed May 5, 2009 and U.S. Provisional Application No. 61/118,511 filed Nov. 28, 2008.

BACKGROUND OF THE INVENTION

1. Field of the Invention

The present invention relates to jumper cables and, more particularly, to jumper cables providing safety and soft start features.

2. Background and Related Art

Cables such as jumper cables are commonly used to connect two low-voltage (e.g. battery-powered) systems temporarily. However, the use of such cables can result in personal injury and equipment damage. For example, one instance where equipment damage or personal injury occurs is in the case of jump starting a car with a "dead" (i.e. partially- or totally-discharged) battery using a car with a good battery. During connection of jumper cables to jump start the car with the discharged battery, a spark may be created, and if the spark is in the vicinity of hydrogen gas commonly generated by car batteries, the spark can ignite the hydrogen gas to explosive effect. Additionally, as the connection is made between vehicles, inductive voltage spikes may be formed, and the voltage spikes can damage sensitive automotive electronics, including expensive computer-controlled engine control components and the like. Additionally, connecting a jumper cable set backward (i.e. with polarity of one of the battery connections reversed) can also cause injury or damage.

BRIEF SUMMARY OF THE INVENTION

Implementation of the invention provides a connecting cable between two low-voltage systems (such as batteries) that includes a safety circuit. The safety circuit leaves the two low-voltage systems disconnected until it determines that it is safe to make a connection. If the safety circuit detects an unsafe condition, it responds to the unsafe condition in one or more of several fashions. In some instances, the safety circuit can internally reverse connection polarity to correct for incorrect connections between low-voltage systems of a reversed-polarity type. In some instances, the safety circuit provides an audible and/or visible alarm identifying a potential problem. In some instances, the safety circuit refuses to make a connection between the two low-voltage systems while an unsafe condition exists.

When the safety circuit determines that no unsafe conditions exist and that it is safe to connect the two low-voltage systems, the safety circuit may connect the two systems by way of a "soft start." The soft start provides a connection between the two systems that is not instantaneous, but is instead provided over a period of time, such as tens of milliseconds, that reduces or prevents inductive voltage spikes on one or more of the low-voltage systems. The soft start procedure reduces and/or prevents damage to sensitive low-voltage electronics forming a part of one or more of the low-voltage systems.

Some implementations of the invention utilize one or more high-current transistors as a switch to connect the two low-voltage systems. The one or more transistors are controlled by the safety circuit or control circuit that detects the condition at each end of the connection cable or cables. In other implementations providing automatic correction of attempted reversed-polarity connections, additional components are used to provide additional convenience. While such implementations provide no additional safety benefit over implementations not providing automatic polarity reversal as the connection is not completed when a reversed polarity is detected, the added convenience of not requiring manual polarity correction may justify the added component cost in some instances.

As it may be desirable to connect two low-voltage systems in an instance where one of the low-voltage systems has a completely-discharged battery incorporated into it, implementations of the invention may utilize a method for detection of proper polarity of the connections between the low-voltage systems. This method is particularly useful when a voltage of one of the low-voltage systems is below a reliable detection threshold and relies on nonlinear behavior of any discharged batteries in the low-voltage system. The polarity of the discharged battery (and thus whether the connected cable is connected correctly) is determined by passing a small amount of current through it and determining whether a corresponding voltage rise is observed (indicating a correct polarity connection) or not (indicating an incorrect polarity connection). In some implementations, test currents can be applied in opposite polarities and the resulting measured voltages compared to more reliably detect incorrect polarity connection and additional potential problem causes.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

FIGS. 9-17 show flow charts illustrating processes that may be implemented in the circuit of FIGS. 7-12.

DETAILED DESCRIPTION OF THE INVENTION

Figure 1:
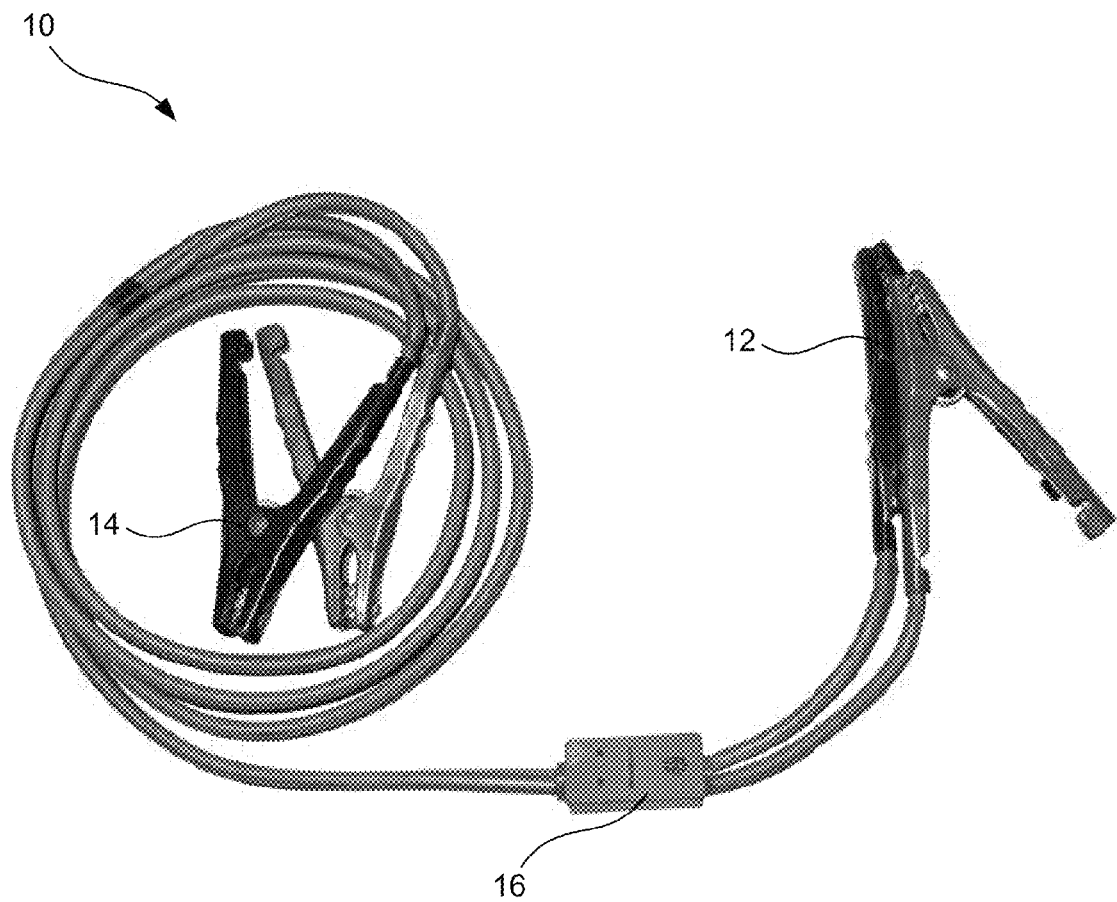
FIG. 1 shows a perspective view of a jumper cable embodiment.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Embodiments of the invention provide a connecting cable or cables (such as jumper cables) between two low-voltage systems (such as batteries, battery-powered systems, or low-voltage systems incorporating one or more batteries) that includes a safety circuit. The safety circuit leaves the two low-voltage systems disconnected until it determines that it is safe to make a connection. If the safety circuit detects an unsafe condition, it responds to the unsafe condition in one or more of several fashions. In some instances, the safety circuit can internally reverse connection polarity to correct for incorrect connections between low-voltage systems of a reversed-polarity type. In some instances, the safety circuit provides an audible and/or visible alarm identifying a potential problem. In some instances, the safety circuit refuses to make a connection between the two low-voltage systems while an unsafe condition exists.

When the safety circuit determines that no unsafe conditions exist and that it is safe to connect the two low-voltage systems, the safety circuit may connect the two systems by way of a "soft start." The soft start provides a connection between the two systems that is not instantaneous, but is instead provided over a period of time, such as tens of milliseconds, that reduces or prevents inductive voltage spikes on one or more of the low-voltage systems. The soft start procedure reduces and/or prevents damage to sensitive low-voltage electronics forming a part of one or more of the low-voltage systems.

Some embodiments of the invention utilize two high-current transistors as a switch to connect the two low-voltage systems. The transistors are controlled by the safety circuit or control circuit that detects the condition at each end of the connection cable or cables. In other embodiments providing automatic correction of attempted reversed-polarity connections, additional components are used to provide additional convenience. While such embodiments provide no additional safety benefit over embodiments not providing automatic polarity reversal as the connection is not completed when a reversed polarity is detected, the added convenience of not requiring manual polarity correction may justify the added component cost in some instances.

In some embodiments, inexpensive transistors may be used, and the safety circuit or control circuit incorporates features to protect the transistors from potential damage. For example, the safety or control circuit may maintain a thermal model of the transistors and may turn the transistors off and on to protect the transistors against failure. Additionally, the safety or control circuit may monitor for over-current conditions that could destroy the transistors in short periods of time, and could turn off the transistors when such conditions are detected. Such types of protection/detection also may serve to protect components of one or more of the connected low-voltage systems, such as by preventing a starter motor from overheating due to excessive cranking. The safety or control circuit may also monitor for under-voltage conditions on the transistor supply side, to prevent the transistors from entering a non-fully-on state that would cause increased heating and damage to the transistors.

As it may be desirable to connect two low-voltage systems in an instance where one of the low-voltage systems has a completely-discharged battery incorporated into it, embodiments of the invention may utilize a method for detection of proper polarity of the connections between the low-voltage systems. Such a method is particularly useful when a voltage of one of the low-voltage systems is below a reliable detection threshold. The method may rely on nonlinear behavior of any discharged batteries in the low-voltage system. The polarity of the discharged battery (and thus whether the connected cable is connected correctly) is determined by passing a small amount of current through it and determining whether a corresponding voltage rise is observed (indicating a correct polarity connection) or not (indicating an incorrect polarity connection). In some embodiments, test currents can be applied in opposite polarities and the resulting measured voltages compared to more reliably detect incorrect polarity connection and additional potential problem causes.

Similar methods may be used to discriminate between a short circuit condition (e.g. clamps touching) and a completely-discharged battery, and at least some embodiments may incorporate such features. Embodiments may also be able to detect whether there are batteries connected to both ends of the circuit by biasing the voltage at each connection to a voltage unlikely to occur in the low-voltage systems, such as 6.5 volts for a typical car battery system. If the voltage then varies from this value by a small amount in either direction, a battery is determined to be connected.

FIG. 1 provides a perspective view of a jumper cable set 10 incorporating features in accordance with embodiments of the invention. The jumper cable set 10 includes a first pair of contact clamps 12 and a second pair of contact clamps 14. When two low-voltage systems (e.g. systems commonly including one or more batteries) are to be connected, the first pair of contact clamps 12 and the second pair of contact clamps 14 are used to connect to high and low (e.g. high and ground) terminals of the two low-voltage systems, similar to the manner in which such connections are commonly made with existing jumper cables. In automotive systems and other vehicles (boats, motorcycles, all-terrain vehicles (ATVs), etc.), the final connection is commonly made to a ground location away from any battery to minimize the risk of any spark igniting hydrogen gas off-gassed by the battery. While this final connection is used or recommended with embodiments of the invention for maximum safety, such sparking is greatly reduced using embodiments of the invention, as no electrical connection is provided between the first pair of contact clamps 12 and the second pair of contact clamps 14 until it has been determined that it is safe to do so.

The jumper cable set 10 includes a control box 16 that provides one or more features including the features of testing the connections and of preventing any electrical connection until it has been determined that it is safe to provide the electrical connection. Although the control box 16 is illustrated as being physically close to the first pair of contact clamps 12 in FIG. 1, it should be understood that the control box 16 can be located at any physical position along the jumper cable set 10 where it can control the electrical connection between the two pairs of contact clamps 12, 14. Placing the control box 16 near one of the ends of the jumper cable set 10 may provide some benefits to a user of the jumper cable set 10, such as making it more intuitive to know which end of the jumper cable set 10 has a problem by lighting an indicator on one side of the control box 16. It may also make it easier to see when the unit is powered (such as by a power-on LED). It also keeps the control box 16 in a location less likely to be stepped on, tripped over, etc. Such a location makes it less likely for one of the two pairs of contact clamps 12, 14 to be disturbed from their attachments to the battery by a user seeking to view the control box 16, and may assist in keeping the control box 16 out of water that may be on an underlying surface.

The control box 16 includes a safety circuit that leaves the two low-voltage systems disconnected until the safety circuit determines that it is safe to make the connection. If the safety circuit determines that it is unsafe to proceed, it may sound an audible alarm or illuminate one or more warning lights on the control box 16 to identify any detected potential problem before the problem can cause damage or injury. In some embodiments, the selection of lights illuminated or a physical and/or timed pattern of lights illuminated may indicate the type of problem detected. In other embodiments, no alarm (visual or auditory) is provided; instead, the connection is simply not made.

When the safety circuit determines that it is safe to proceed, the safety circuit completes the connection between the two low-voltage systems smoothly in a soft start. The soft start prevents or minimizes inductive voltage spikes that could damage sensitive electronics of the low-voltage systems (such as an automobile computer component). In some embodiments, as a connection is made, and audible and/or visual notification may be provided so the user becomes aware that the connection has been made. In the case of a vehicle having a discharged battery, the user can thus be notified that the vehicle can then be started.

Figure 2:
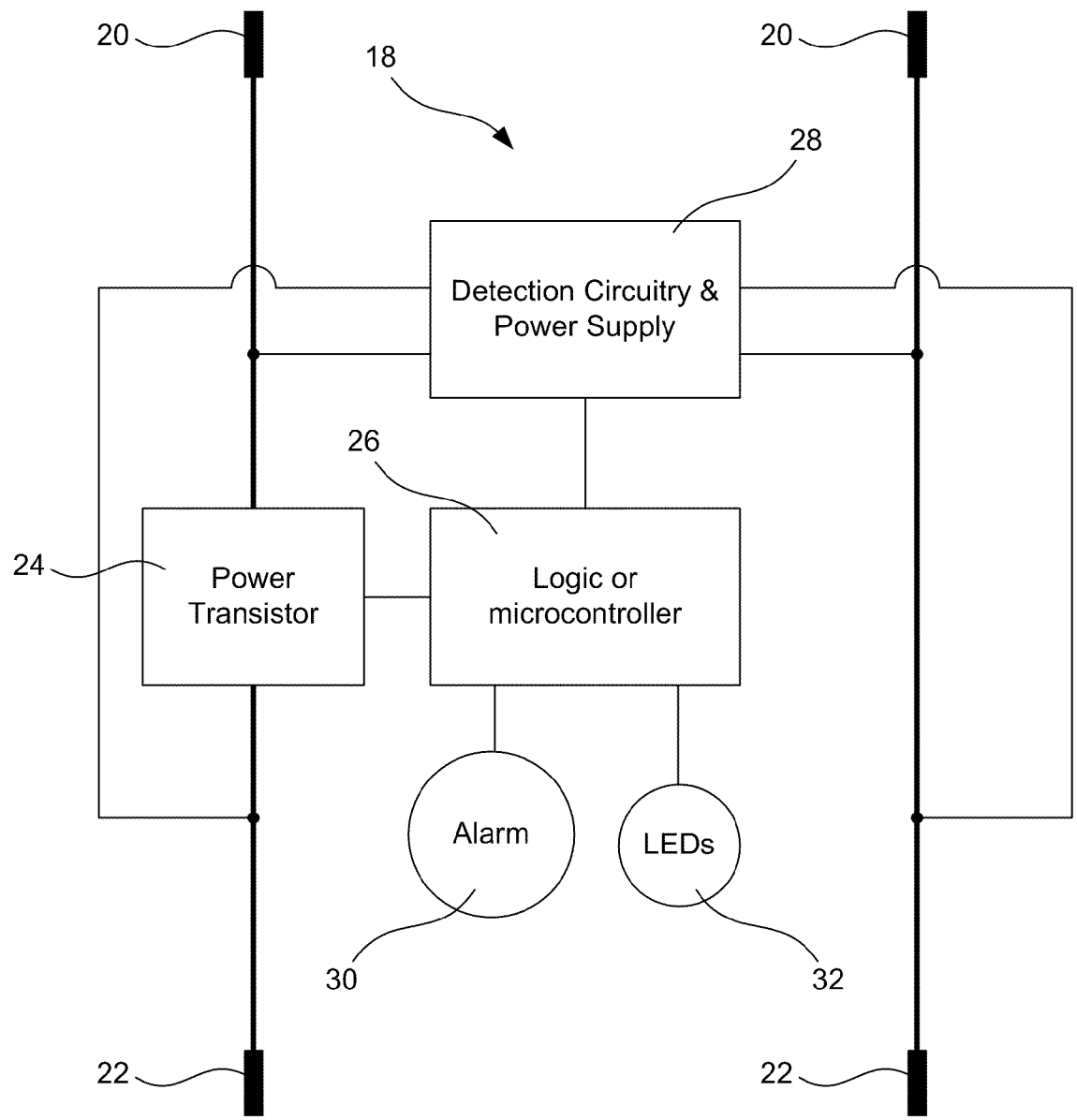
FIG. 2 shows a schematic illustrating concepts in accordance with embodiments of the invention.

FIG. 2 provides a diagram illustrating the concepts incorporated into one embodiment of a safety circuit 18 such as housed within the control box 16. The safety circuit 18 includes input terminals 20 and output terminals 22 that are electrically connected to the first and second pairs of contact clamps 12, 14. The input terminals 20 and the output terminals 22 are connected in this embodiment by way of one or more power transistors 24. The power transistor 24 (or transistors) are controlled by a logic circuit or microcontroller 26 that is operatively connected to a detection circuit and power supply 28. The detection circuit and power supply 28 and the logic circuit or microcontroller 26 may be powered by power received from the input terminals 20 (or alternatively the output terminals 22, depending on how the jumper cables are connected to active/inactive low-voltage systems), and therefore, no internal battery/power supply need be provided in at least some embodiments. The detection circuitry detects connection conditions on the input terminals 20 and the output terminals 22. The detection circuitry determines whether it is safe to connect the input terminals 20 and the output terminals 22. In embodiments where the safety circuit 18 is configured to correct for incorrect connection conditions (not shown in FIG. 2) such as a reversed-polarity connection, the detection circuitry also detects such conditions and signals that a correction is necessary.

Control or detection information is passed from the detection circuitry to the logic circuit or microcontroller 26. The logic circuit or microcontroller 26 uses this information to activate a connected alarm 30 and one or more optical signals 32 based on the conditions detected by the detection circuitry. For example, if proper connection conditions are detected and it is determined that it is safe to make a connection, the logic circuit or microcontroller 26 can activate a green LED as a signal of proper connection prior to or concurrent with making an electrical connection between the two low-voltage circuits connected to the input terminals 20 and the output terminals 22. Alternatively, a red LED might be activated if an improper connection is detected, along with activation of the alarm 30. Different signals (via the alarm 30 and/or the optical signal 32 or optical signals 32) may be used to indicate different detected conditions (e.g. reversed polarity, no connection, short circuit, etc.).

When the safety circuit 18 determines that it is safe to proceed, the one or more power transistors 24 is used to make the electrical connection between the input terminals 20 and the output terminals 22, thereby connecting the two low-voltage systems. The one or more power transistors 24 may be controlled so as to make the electrical connection in a "soft start" to eliminate inductive voltage spikes that could cause damage to sensitive electronic components that are part of one or both low-voltage systems. The soft start is implemented in the illustrated embodiment by way of the one or more power transistors 24, which allow the electrical connection (e.g. the flow of electrical current between the input terminals 20 and the output terminals 22) to be made slowly, such as over a period of tens of milliseconds. The one or more power transistors 24 are controlled by small voltages provided by the logic or microcontroller 26.

Although the soft start procedure has been illustrated in FIG. 2 using one or more power transistors 24 (which may include one or more power transistor 24 on each of the positive and negative cables, if desired), other embodiments are envisioned, including mechanical embodiments. For example, the soft start concept can be approximated using mechanical relays fitted with suitable filtering components such as inductors and diodes and other spark-suppression components or devices. For example, one system using relays to provide a soft start approximation utilizes a pair of inductors, one on each side of the relay, with back-to-back zener diode pairs between the inductor and the relay and the other line on each side of the relay.

It is anticipated that such an embodiment might be larger and bulkier than an embodiment using semiconductor-based switches. Those of skill in the art will appreciate configurations of such devices that can be used in such embodiments. Similarly, although the embodiment of FIG. 2 provides one or more power transistors 24 acting as switches to connect the two low-voltage systems, other more-complicated configurations can be provided that provide for additional features, such as automatic polarity reversal. In such an embodiment, if the polarity of the connected input terminals 20 or output terminals 22 has been reversed, the safety circuit 18 uses the extra components to correct the polarity as the input terminals 20 are electrically connected to the output terminals 22. Thus, in such an embodiment, the safety circuit 18 includes components for selectively connecting either of the input terminals 20 to either of the output terminals 22. Although such an embodiment does not improve safety over the embodiment of FIG. 2, it does increase convenience, as a user need not remove and re-connect the previously-made connections between low-voltage systems.

Embodiments of the invention can be used in a wide variety of systems for connecting to low-voltage systems and/or for connecting between low-voltage systems. Non-limiting examples include jumper cable sets, retrofit modules for installation on existing jumper cable sets, booster boxes, battery chargers, ground power units for aircraft, temporary power units for recreational vehicles, trailers, boats, and the like, battery-powered equipment charging cords (fork lifts, floor scrubbers, tugs, etc.), DC power connections for solar cells, fuel cells, and other DC-generating equipment, and DC power connections for electronics. It will be understood that embodiments may be used in a variety of situations.

Figure 3:
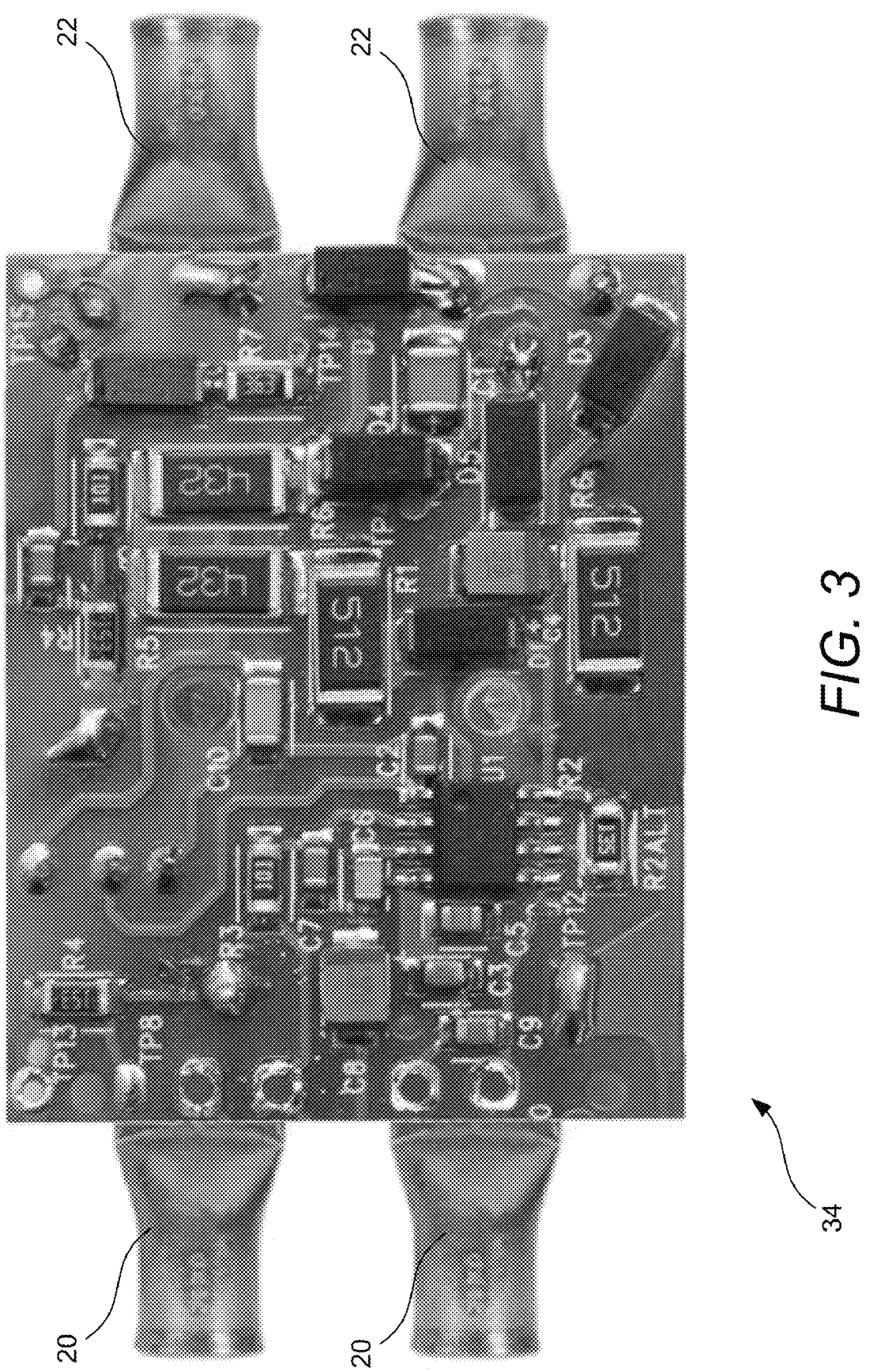
FIG. 3 shows a perspective view of a representative circuit board in accordance with embodiments of the invention.

Embodiments of the invention provide a wide variety of benefits. Such benefits include the soft start procedure that eliminates inductive voltage spikes. Another benefit is the small size of the safety circuit 18, such that the safety circuit 18 can often be provided in-line with the connecting cable, such as illustrated in the jumper cable set 10 shown in FIG. 1. FIG. 3 also illustrates this benefit, showing a perspective view of a representative circuit board that may be used to implement embodiments of the invention. Another benefit is that embodiments keep the power between various terminals off when there are problems that could cause damage or injury, such as reversed cable connections, arcing from short circuits if cable clamps are touching, and prevention of connection to a failed battery incorporated in a low-voltage system. Still other benefits include providing audible and/or visual warnings of unsafe conditions and/or safe connections.

For example, the following is provided by way of sample actions that can be taken using a jumper cable embodiment. If the cables are connected properly, a steady green LED lamp may be lit to indicate that the connection is safe and ready. The power is applied by a soft start as described above, and the user is able to start the car being jumped. However if the cables are connected backward (and the system does not provide the ability to correct reversed connections), a red LED lamp might flash and the power remains off. The user could then reconnect the cables correctly and try again. Similarly, if the cable clamps accidentally are touching or if the positive clamp is also touching a ground source, the red LED could flash (possibly in a different timing pattern or a different LED), the connection would not be completed, and the user could adjust or reconnect the cables correctly and try again. If a connection is attempted to a low-voltage system having a discharged battery with an internal short circuit, the red LED could flash, the power stays off, and the car could not be jump started, even after attempted repositioning of the cables.

Other conditions may result in disconnection of the power between the cable clamps in at least some embodiments. For example, the safety circuit 18 may be programmed to detect a successful starting of a car with a low/dead battery. Upon detection of a successful start, the connection between low-voltage systems is no longer necessary, so the safety circuit 18 may be programmed to automatically electrically disconnect the two systems for safe removal of the jumper cables. Similarly, if the safety circuit 18 determines that a previously-good connection fails (such as one of the cable clamps falls off), it may automatically and rapidly interrupt the connection, thereby preventing potential damage or injury. As yet another example, if a user attempts to crank the engine on the discharged car for longer than a selected period of time (such as thirty seconds), the safety circuit 18 may automatically shut off the connection between systems for a predetermined time (such as one minute) to allow the starter and the jumper cables (e.g. the controller itself) to cool. If the power is interrupted in this fashion, a red LED might be lit (again, a different pattern or different light might be used) while the connection is interrupted, and a green LED re-lit when the user is permitted to re-try engine starting.

As discussed above, when jumper cables are connected to a car having a discharged battery, the polarity of the connection must be correct to avoid damage to the cars. In many instances, a discharged battery still has a significant residual voltage, but lacks sufficient starting power to start the car. In such instances, upon connection of jumper cables in accordance with embodiments of the invention, the polarity of the made connection may be determined by way of measuring the voltage at the connection. However, in some instances, the discharged battery is completely discharged, such as when the headlights have been left on for an extended period. In other instances, a battery may not be completely dead, but a sufficient electrical load is attached to the battery such that the voltage is too low to allow reliable polarity detection. For example, if a polarity determination is attempted with a low battery when the vehicle's headlights are on, the brake pedal is depressed, or the heater is on, etc., the detected voltage may be close to zero, even if the polarity would be detectable if the load were removed. In such instances, the discharged battery provides insufficient voltage to reliably determine correctness of the polarity of the attempted connection by way of measuring the voltage of the discharged battery alone. Instead, a different method is used to determine whether the connection has been made using proper polarity. This allows an automatic jumper cable controller using this method to prevent damage if the cables are accidentally connected backward while still allowing the car with the discharged battery to be started safely.

Figure 4:
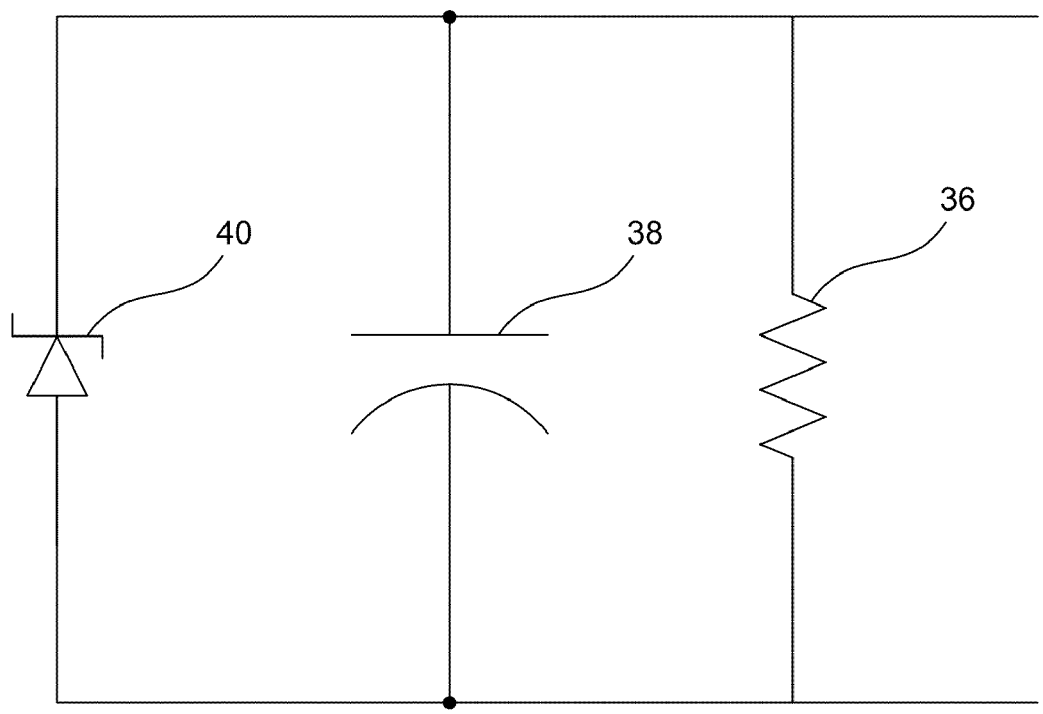
FIG. 4 shows a generalized circuit schematic representative of a discharged car battery in a car.

To understand the method, FIG. 4 provides an electrical circuit diagram that models the car with the discharged battery. The polarity of the discharged battery can be determined by passing a small amount of current through it (and potentially simultaneously through any connected electrical components). The polarity is determined by observing the resulting voltage created in the battery-car system. When a proper-polarity connection is made, the discharged battery's voltage will rise in a normal fashion; however, when the cables are connected backward, the voltage is limited by the nonlinear behavior of the discharged battery and the automotive equipment attached to it. This allows the control circuitry to identify an incorrectly-connected charging system before it can cause a problem.

In FIG. 4, a resistance 36 and a capacitance 38 model headlights, interior lights, and other electrical loads of the automotive equipment that may be present. Meanwhile, a diode 40 represents/models the non-linear behavior of the discharged battery and the diodes in the car's alternator. When the jumper cables are connected correctly, the diode 40 conducts only a negligible amount of current, allowing the voltage to rise in response to the test current. In contrast, when the jumper cables are connected backwards, the diode conducts most of the test current, thus limiting the resulting voltage to a small value. When a reversed connection is detected, the controller can respond in any fashion discussed above (e.g. prevent completing the connection, sound an alarm or illuminate a warning light, automatically reverse the connection, etc.).

Figure 5:
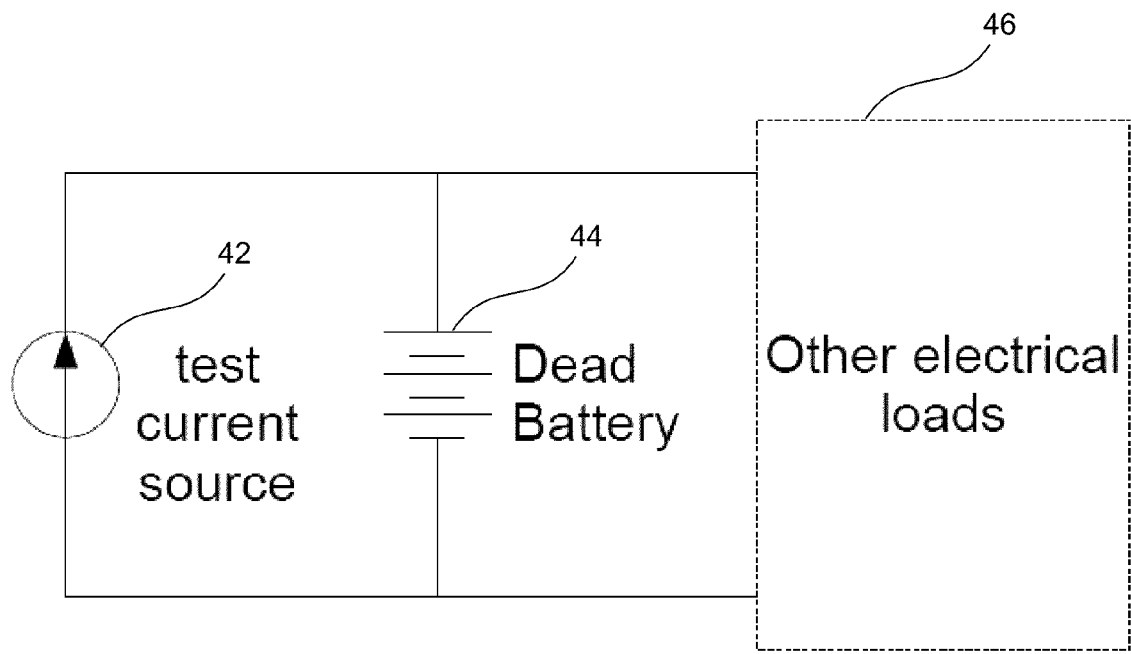
FIG. 5 shows a representative schematic showing one method for testing a battery for proper polarity.
Figure 6:
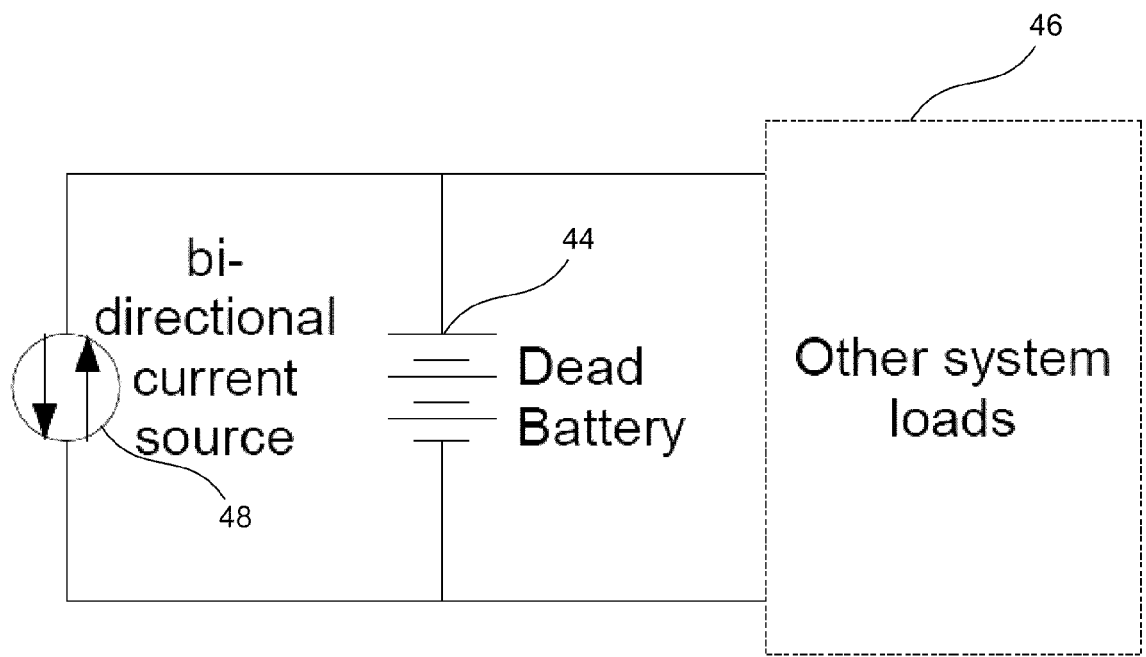
FIG. 6 shows a representative schematic showing another method for testing a battery for proper polarity.

FIGS. 5 and 6 illustrate two embodiments for detecting correct polarity of a discharged battery. In FIG. 5, a test current source 42 is electrically connected to a system containing a discharged battery 44 and other electrical loads 46. In this embodiment, a single test current is passed through the discharged battery 44. If the voltage rises above a voltage threshold (say approximately two volts for a twelve-volt battery), the associated charging equipment or other controller determines that the polarity correction is correct, and proceeds to complete the connection to the low-voltage system so the battery can be charged. If the voltage does not rise above the threshold, the connection is not completed. This embodiment has an advantage of simplicity when compared with the embodiment of FIG. 6.

In the embodiment of FIG. 6, a bidirectional current source 48 is used in place of the test current source 42. Thus, in this embodiment, two test currents are used in succession, one in each direction. The two induced voltages are compared with the voltage threshold, where one will commonly be found to be above the threshold while the other voltage is below the threshold. This embodiment, while more complicated than the embodiment of FIG. 6, can identify other problem cases, which may be less likely. For example, if both voltages are below the threshold, this condition may be indicative of a battery having an internal short circuit. As another example, if both voltages are above the threshold, it may be indicative of a broken battery cable on the car having the discharged battery. As may be appreciated, these methods of detecting proper polarity of connection to a discharged battery as well as other battery conditions may be implemented into a wide variety of applications, including battery charging systems, battery boosting systems, jumper cable systems, and the like.

Figure 7:
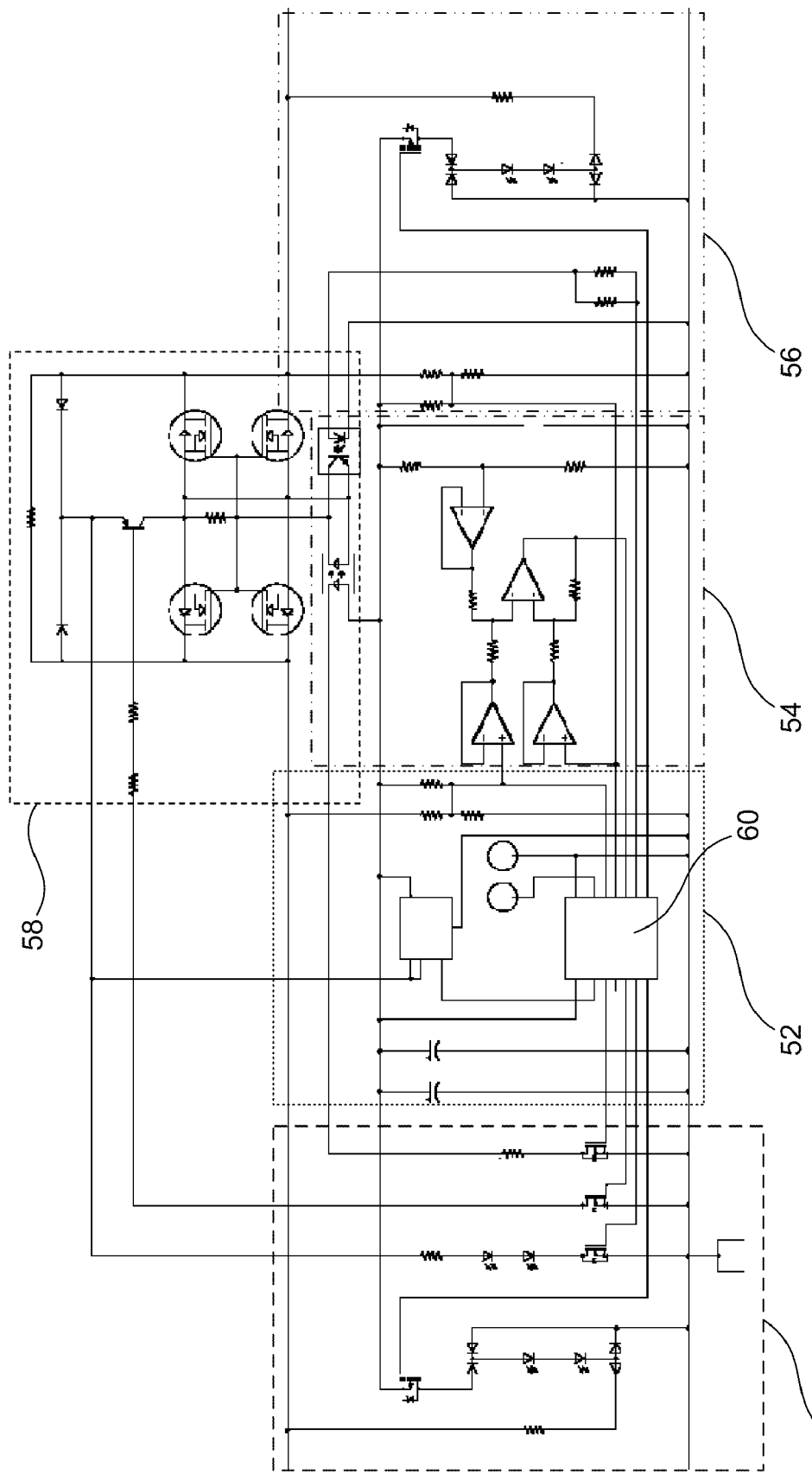
FIG. 7 shows a representative circuit diagram for use in an embodiment of the invention.
Figure 8:
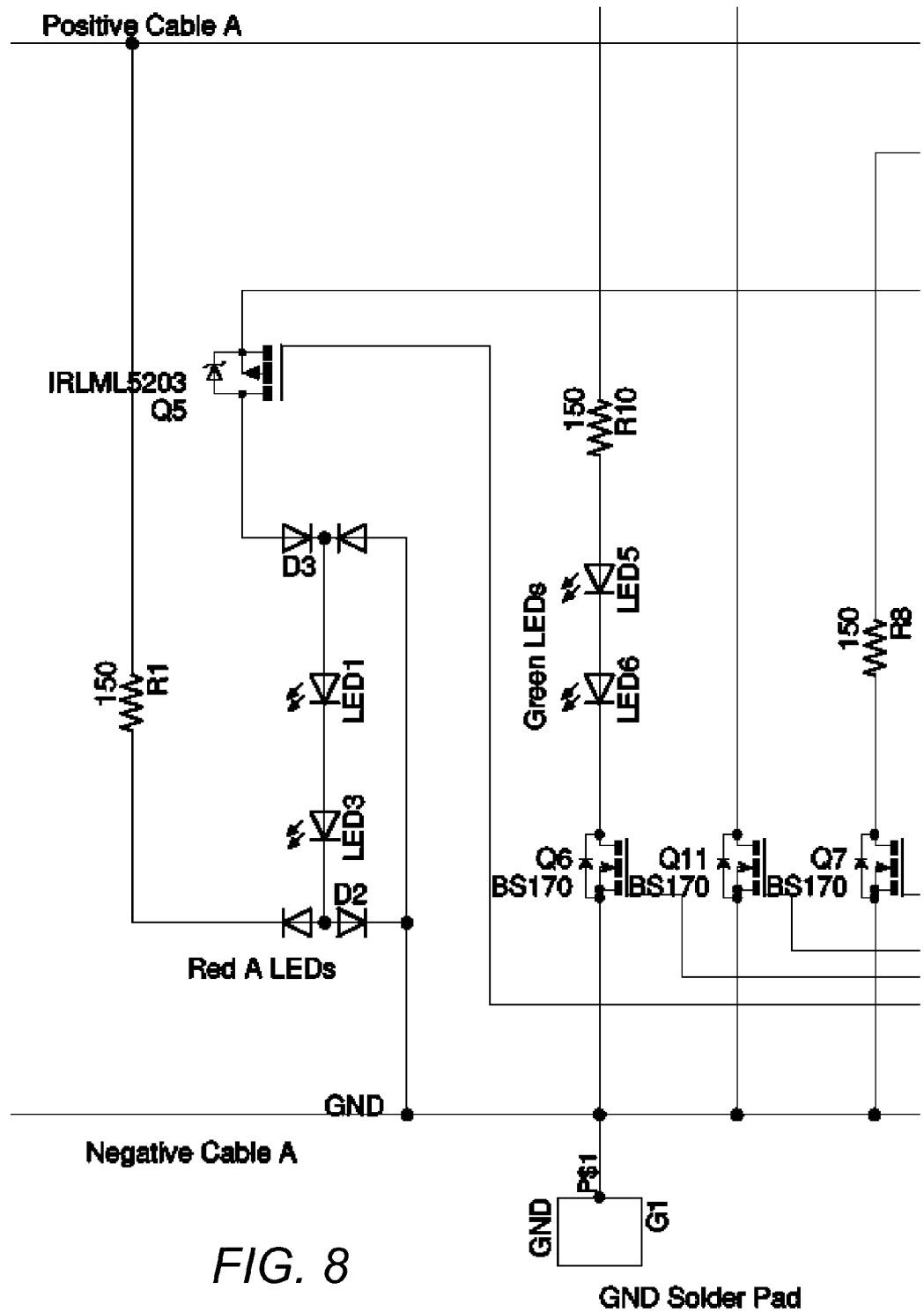
FIGS. 8-12 show expanded views of portions of the circuit diagram shown in FIG. 7.
Figure 9:
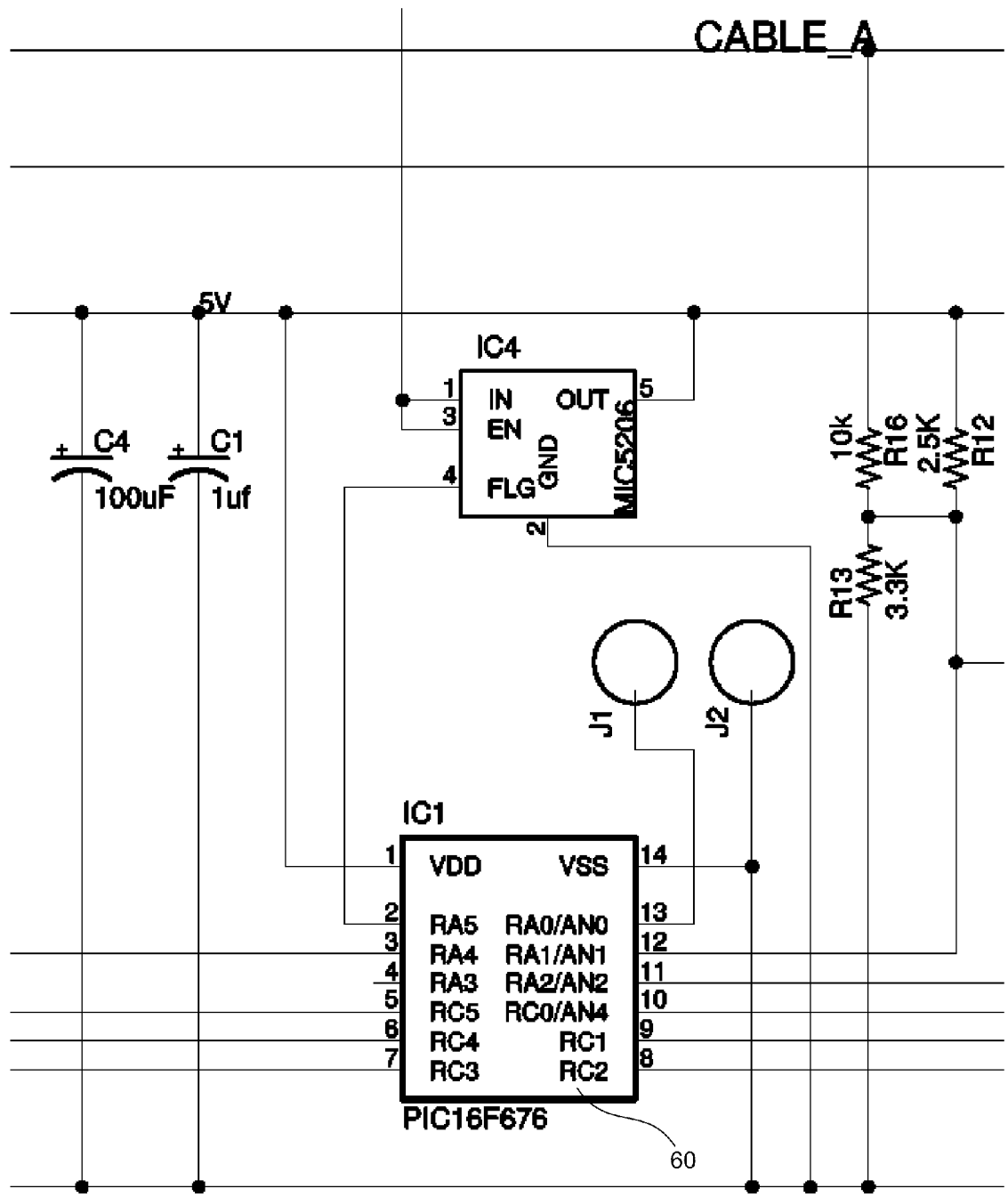
Figure 10:
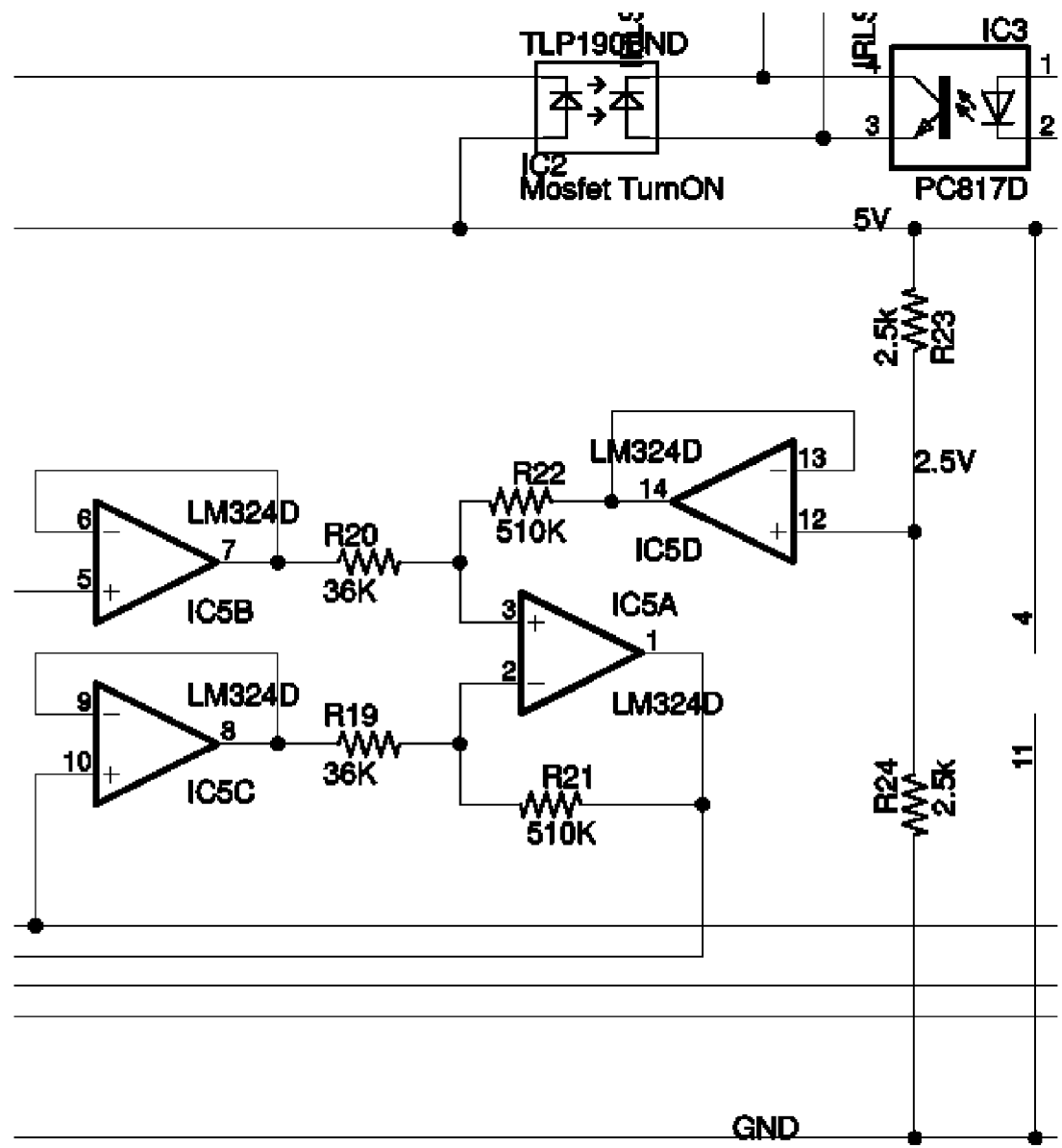
Figure 11:
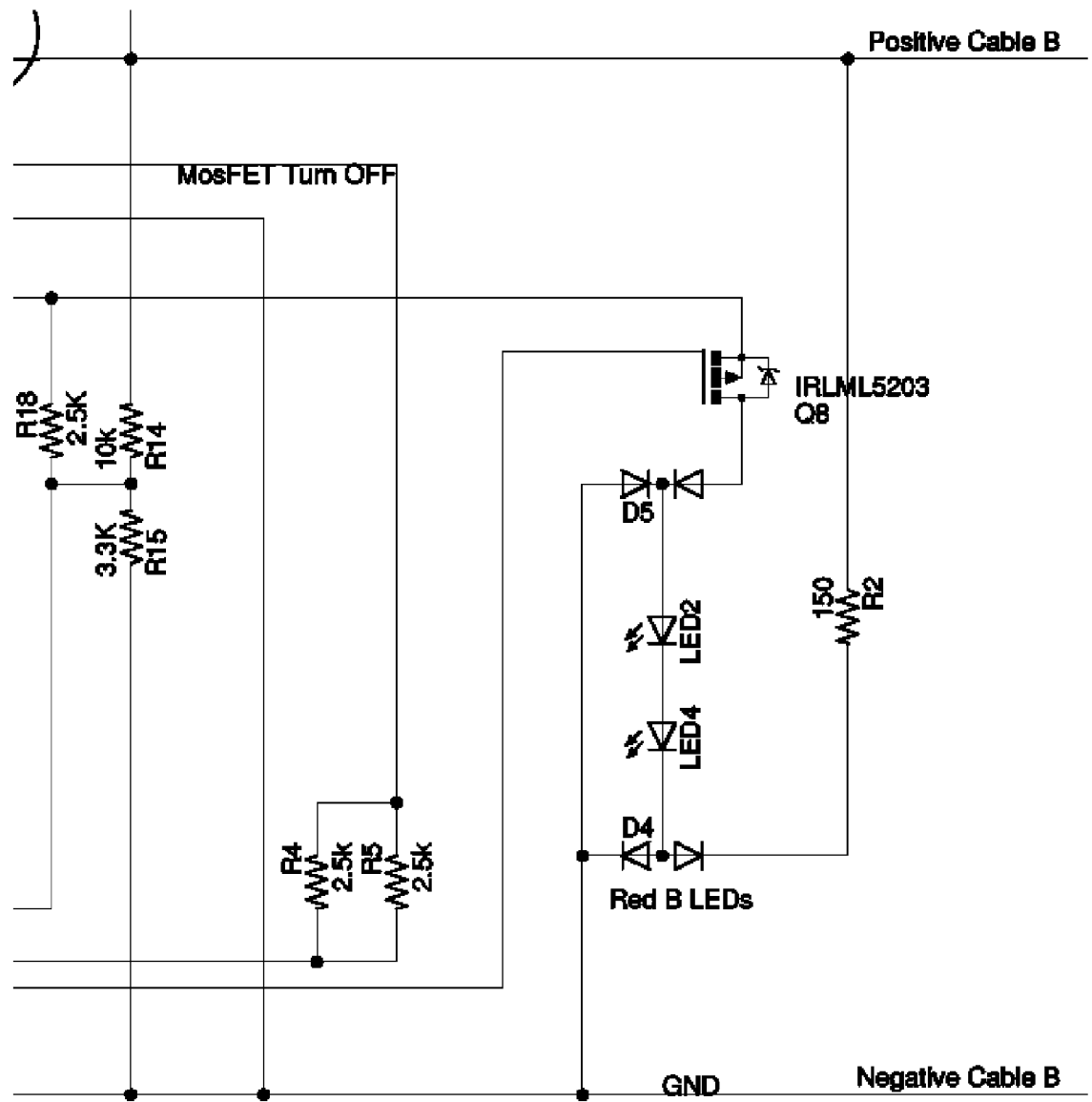
Figure 12:
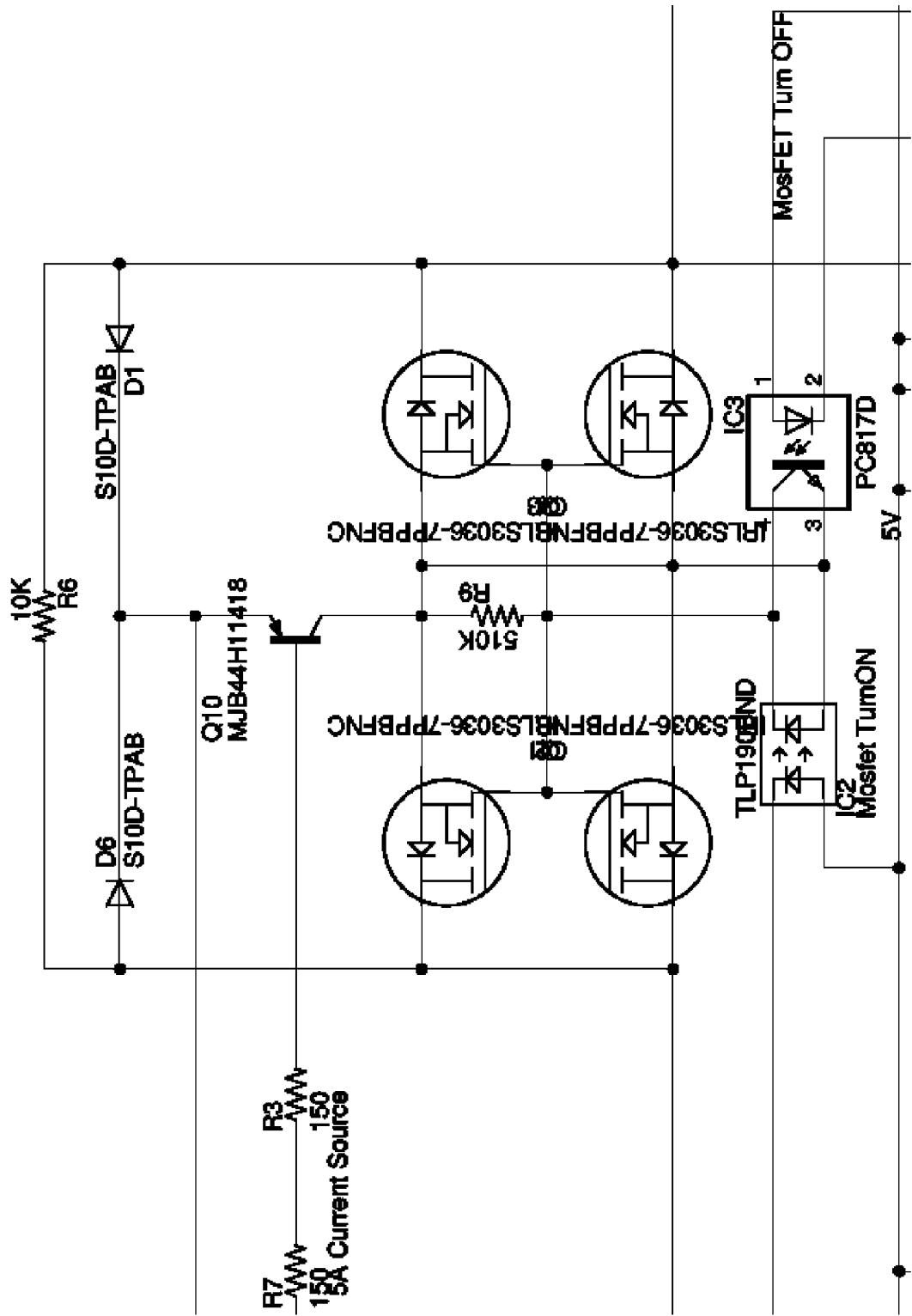

FIG. 7 provides a circuit diagram of one embodiment of the safety circuit 18. The view of FIG. 7 has been expanded to show illustrative components and component values in FIGS. 8-12, according to the areas marked in FIG. 7: area 50 is shown in more detail in FIG. 8, area 52 is shown in more detail in FIG. 9, area 54 is shown in more detail in FIG. 10, area 56 is shown in more detail in FIG. 11, and area 58 is shown in more detail in FIG. 12. While an illustrative circuit has been shown and illustrative component values have also been shown, it is anticipated that many different circuit components, values, and variations could alternatively be used. Therefore, the illustrated circuit and component values are provided by way of description of one circuit for implementing an embodiment of the invention, and not by way of limitation.

FIGS. 13-17 illustrate flow charts describing one set of processes that may be implemented using the circuitry illustrated in FIGS. 7-12, and are illustrative of features of some embodiments of the invention. In the description that follows, references to pin numbers are in reference to pins of a microcontroller 60 contained in the illustrated circuitry, and the pin numbers so referenced are shown in more detail in FIG. 9. The pin number references should be understood to be illustrative, and it is anticipated that microcontrollers similar to microcontroller 60 can be programmed to respond to a wide variety of circumstances on varying pins and to provide responses to a wide variety of pins. It is anticipated that one or more of the circuit components (including any microcontrollers similar to microcontroller 60) may include programmed or programmable components incorporating logic and/or software configured to effect processes similar to those discussed with respect to FIGS. 13-17, and embodiments of the invention embrace and incorporate such logic and/or software.

Figure 13:
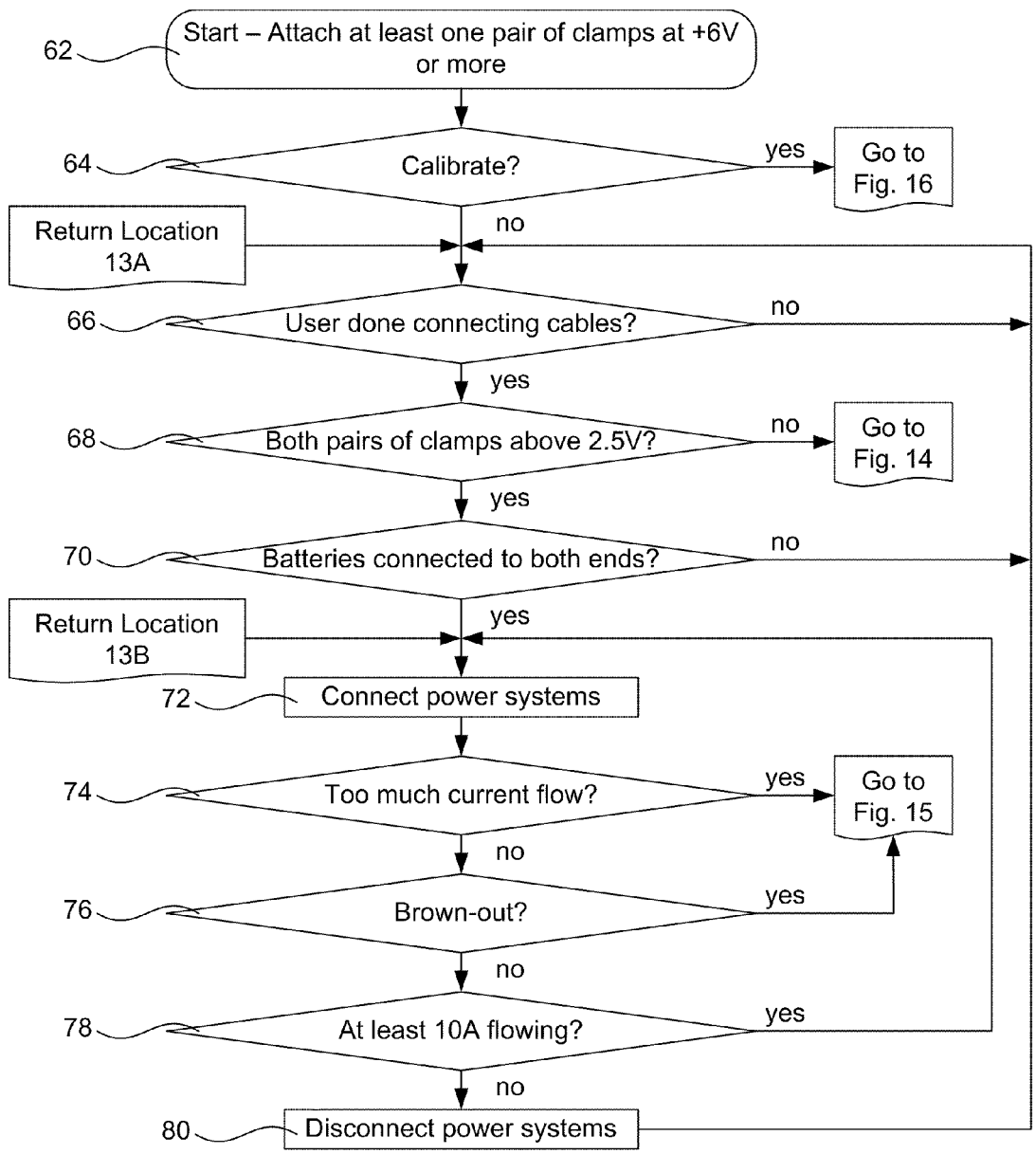

FIG. 13 provides a flow chart for a main process of the circuitry of FIGS. 7-12. Execution begins at step 62, where at least one pair of contact claims (e.g. the first pair of contact clamps 12 and/or the second pair of contact clamps 14) is connected to a voltage source of at least a minimum voltage (here six volts). Connection of one or more of the contact clamps to a voltage supply serves to provide power to the circuit and any components thereof that require such supply to begin working, such as the microcontroller 60. Once at least one of the pairs of contact clamps is connected, any ports needing initialization are initialized.

Execution then proceeds to decision block 64, where a determination is made as to whether to calibrate the system. Whether to calibrate may be determined by an external input that drives one of the pins of the microcontroller to low (or to high), such as by a jumper or other device. If calibration is to occur, execution proceeds to the calibration processes illustrated in FIG. 16, otherwise, execution proceeds to decision block 66. At decision block 66, it is determined whether the user is done connecting cables. This may be determined by way of determining whether voltages measured at the cable clamps are within a few counts of the last several measurements. The measured voltages remain fairly stable once a particular connection has been made. If the user is still connecting the cables, execution loops back for further evaluation of whether the user has completed connecting the cables.

Otherwise, execution proceeds to decision block 68, where a determination is made as to whether both pairs of clamps are above a minimum reference voltage. In the illustrated flow chart, the minimum reference voltage is 2.5 volts, but other reference voltages may be used. If both pairs of clamps are not above the minimum reference voltage, execution proceeds to reverse polarity detection processes illustrated in FIG. 14. If, however, both pairs of clamps are above the minimum reference voltage, execution proceeds to decision block 70, where a determination is made as to whether batteries are connected to both ends of the jumper cables, such as by determining whether the low voltage cable is not at the open circuit voltage. If it is determined that batteries are not connected to both ends, execution loops back to decision block 66. If, however, batteries are connected at both ends, execution proceeds to step 72, where the two low-voltage power systems are electrically connected (such as by making pin 10 of the microcontroller high to control high-current transistors). As discussed above, the electrical connection of the two low-voltage systems can be made by way of a soft start.

Execution then proceeds to decision block 74, where a determination is made as to whether too much current is flowing. This determination is made by determining whether the absolute value of the difference in currents in the two cables (positive and negative) is greater than a selected reference current. If too much current is flowing, execution proceeds to cool down procedures illustrated in FIG. 15. If the reference current is not exceeded, execution proceeds to decision block 76, where a determination is made as to whether a brown-out condition (a condition where there is an under-voltage on the supply side that may cause the power transistors to fail to turn on completely) is detected. If such a condition is detected, execution proceeds to the cool-down procedures of FIG. 15. If not, execution proceeds to decision block 78, where a determination is made as to whether at least a minimum amount of current (illustrated as ten amps) is flowing through the cables. If the minimum current is flowing, then the cables are still needed, and execution loops back to step 72. If, however, the current flow has dropped below the minimum current (e.g. the car with the discharged battery has been started, etc.), execution proceeds to step 80, where the microcontroller 60 electrically disconnects the two low-voltage systems (e.g. by making pin 10 low). Thereafter, execution either terminates (not shown) or loops back to decision block 66 for detection of a need to electrically re-connect the cable ends.

Figure 14:
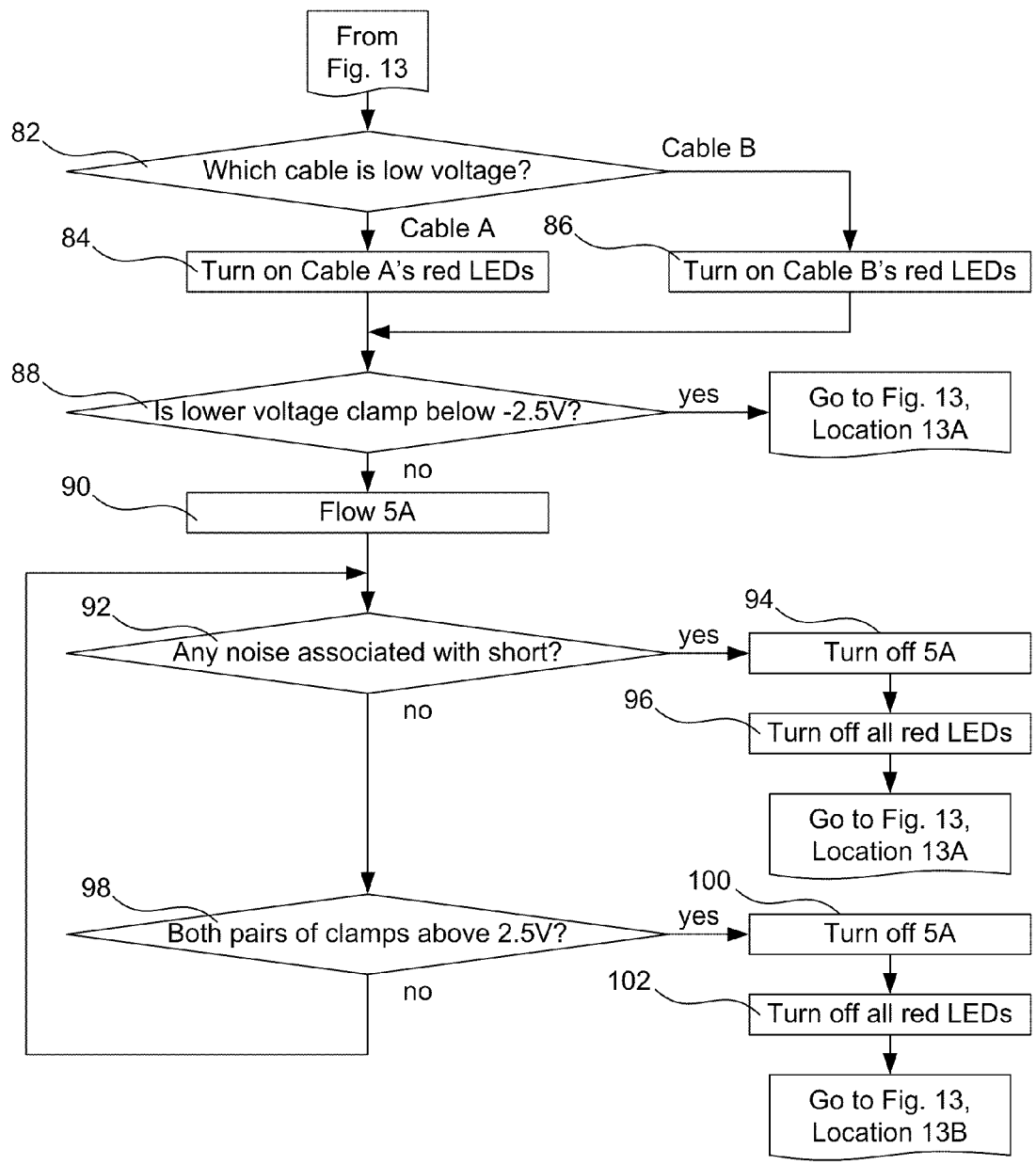

FIG. 14 shows an illustrative polarity detection procedure that may be used when both pairs of cable clamps are not determined to be above a minimum reference voltage, as determined at decision block 68 of FIG. 13. Execution proceeds to decision block 82, where a determination is made as to which cable is low voltage. If Cable A (corresponding, for example, to the first pair of contact clamps 12) is low voltage, execution proceeds to step 84, where one or more red LEDs (or some other signal) corresponding to Cable A are turned on to provide a signal to the user of the cables (e.g. pin 7 is made high). Alternatively, if Cable B is low voltage, execution proceeds to step 86, where one or more red LEDs (or some other signal) corresponding to Cable B are turned on to provide a signal to the user of the cables (e.g. pin 8 is made high).

In either instance, execution then proceeds to decision block 88, where a determination is made as to whether the cable having the lower voltage is at a voltage below a negative reference voltage (illustrated as negative 2.5 volts). If the voltage of the cable having the lower voltage is determined to have such a voltage, that cable is connected in reverse polarity, and execution returns to FIG. 13, Location 13A, immediately prior to decision block 66. Thus, whichever red LEDs (or other signal) were turned on will remain on until the cable connected in reverse polarity is removed and reconnected with proper polarity.

If, the lower voltage clamp is not more negative than the negative reference voltage, one of two circumstances may be present. First, the polarity may be correct, but the lower voltage cable may be connected to a battery so discharged as to prevent reliable detection of the polarity based on voltage measurements alone. Second, the polarity may be incorrect, but the lower voltage cable may be connected to a battery so discharged as to prevent reliable detection of the polarity based on voltage measurements alone. In either case, the cable may apply a small current to the system to determine which circumstance is occurring, so execution proceeds to step 90, where a small current is permitted to flow from the high-voltage cable to the low-voltage cable (e.g. pin 5 is made high). In the illustrated case, the current is shown as being five amps.

Execution then proceeds to decision block 92, where a determination is made as to whether any noise associated with opening a short on the cable has been detected. If so, execution proceeds to step 94 where the current is turned off (e.g. pin 5 made low). Execution then proceeds to step 96, where the red LEDs are turned off (pins 7 and/or 8 made low), and then proceeds to FIG. 13, Location 13A, immediately prior to decision block 66. As long as the short circuit condition exists, execution will then return to the processes of FIG. 14 and loop back to Location 13A of FIG. 13, causing the process to repeatedly pass through one of steps 84 and 86, followed by step 96, causing one set of LEDs (or other signal) to flash, thereby indicating to the user the presence of a short circuit.

As discussed above, a reversed connection, such as to a system having a very discharged battery, may conduct current similarly to a short circuit, which may therefore also signal a reversed connection. Therefore, a user seeing a flashing red LED may be instructed (or know from instructions for the cables) to attempt to reverse the connection. Then, if the flashing red LED continues, the user may be instructed to make no further attempts to connect the two low voltage systems or to jump start the discharged vehicle because a short circuit appears to exist.

If no short circuit is detected at decision block 92, execution proceeds to decision block 98, where a determination is made whether both pairs of clamps are above a reference voltage (here illustrated as 2.5 volts). If the polarity of the low voltage cable connection is correct, the small current will eventually raise the voltage of the discharged system above this reference voltage. Therefore, until both pairs of clamps are above 2.5 volts, execution loops back to decision block 92 as shown. Once both pairs of clamps are above 2.5 volts, execution proceeds to step 100, where the small current is turned off (e.g. pin 5 made low), and then execution proceeds to step 102, where all red LEDs are turned off (e.g. pins 7 and/or 8 made low). Execution then returns to FIG. 13 at Location 13B, just prior to step 72, where the low-voltage systems are electrically connected. Thus, the low-voltage systems are electrically connected at step 72 after the process of FIG. 14 determines that the connections have been made with proper polarity.

Figure 15:
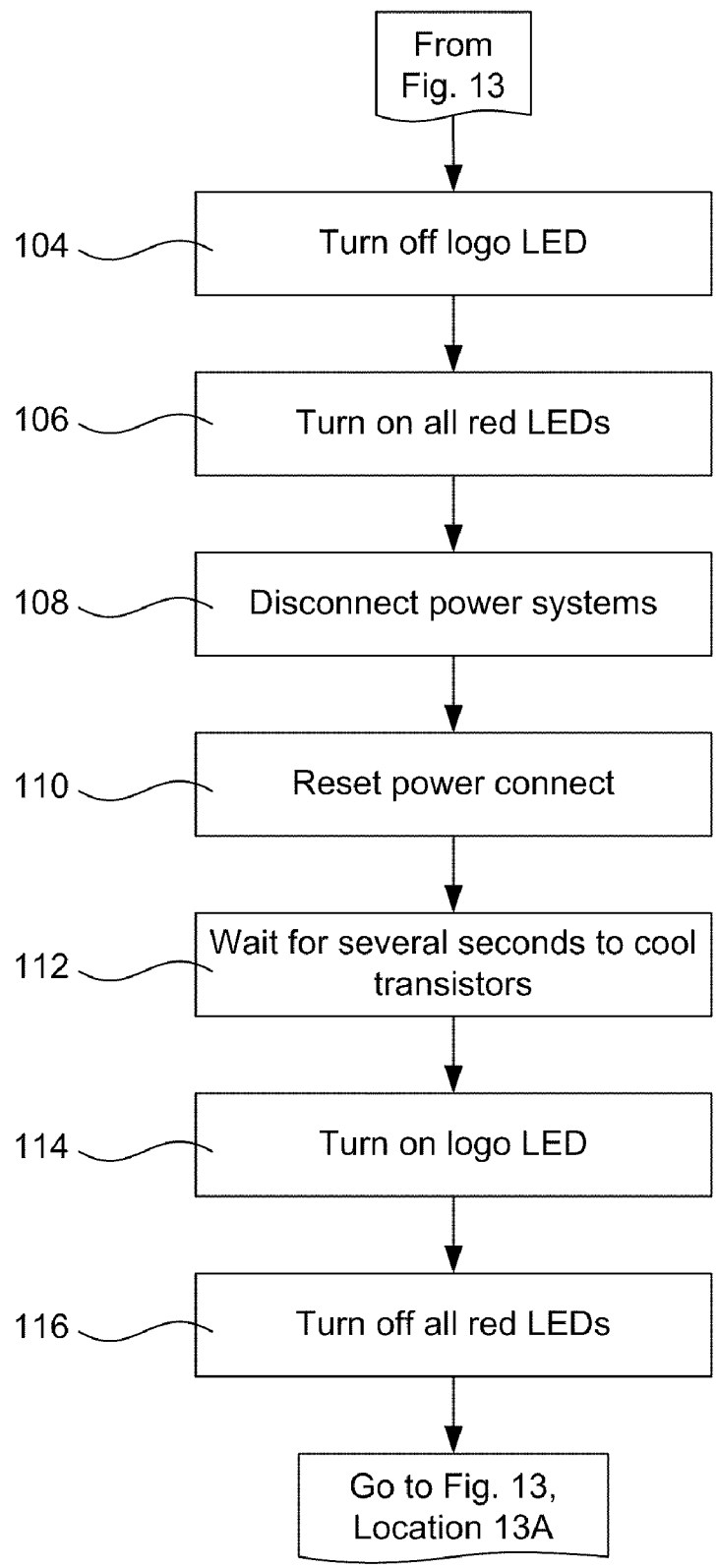

FIG. 15 illustrates a representative cool-down procedure that may be used in situations where either an over-current condition (e.g. decision block 74) or a brown-out condition (e.g. decision block 76) is detected. If either condition lasts for too long, the condition can lead to failure of the power transistors, especially when less-expensive power transistors are used. In the case of a brown-out, the lower voltage prevents the power transistors from turning on (or staying on) completely, which may increase the heat losses experienced by the transistors, leading to failure. Over-current conditions can also destroy the transistors. To allow for the use of less-expensive power transistors, the process illustrated in FIG. 15 permits shutoff of the transistors before failure occurs and gives the transistors time to cool off before use of the transistors resumes. Although the description of FIG. 15 is directed to the primary power transistors, it should be understood that similar processes may be used for the transistors providing the low-current current discussed with respect to FIG. 14.

In FIG. 15, execution begins at step 104, where a logo LED (which, when on, may be indicative that the cables are powered and ready for normal use) is turned off (e.g. pin 6 made low). Execution then proceeds to step 106, where all the red LEDs (or other indicators) are turned on (e.g. pins 7 and 8 made high), indicative of the overheat fault condition. At step 108, the low-voltage systems are electrically disconnected (e.g. pin 10 made low and pin 9 made high). At step 110, the power connect system is reset (e.g. pin 9 made low), while at step 112, the system waits for a period of time to allow the transistors to cool. The microcontroller 60 may be programmed with a model (such as linear over time) approximating heat losses of the transistors over time to ensure that the period of time where the transistors are turned off is adequate to permit sufficient cooling of the transistors before a restart is attempted. Similarly, a thermal model (such as a time integration of current squared times resistance losses) may be used by the microcontroller to approximate heating of the transistors in normal use for protective shut-off and restart procedures as outlined in somewhat more detail in FIG. 17.

Once sufficient time has passed to allow the transistors to be safely turned on again, execution proceeds to step 114, where the logo LED is turned on (e.g. pin 6 made high), and to step 116, where the red LEDs (or other signals) are turned back off (e.g. pins 7 and 8 made low). Thereafter, execution returns to Location 13A of FIG. 13, just prior to decision block 66, where safety checks are re-executed before the low-voltage systems are re-connected at step 72. Thus, if one or more of the connections to one of the low-voltage systems has changed or if any other circumstance has changed during the cool-down procedure of FIG. 15, power may not be reconnected immediately or at all.

Figure 16:
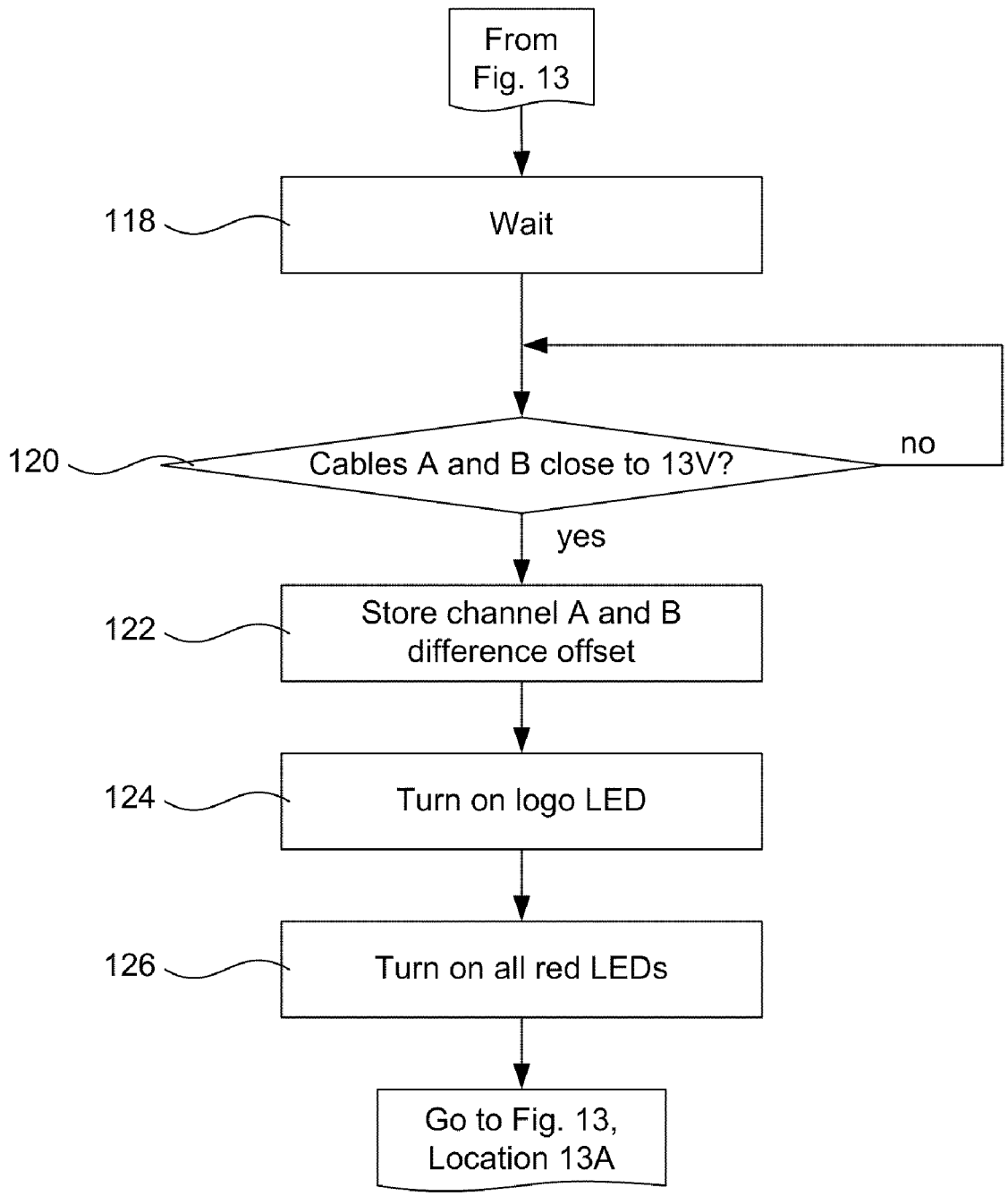

FIG. 16 shows an example calibration process that may be used when calibration is desired (such as after decision block 64 in FIG. 13. Execution begins at step 118, where a wait period passes to allow equilibrium has been reached in the system. Execution then proceeds to decision block 120, where a determination is made as to whether both cables are close to a predetermined calibration reference voltage, illustrated in this case as thirteen volts. If not, execution loops at this point (or back to before the wait period of step 118) until this condition is met. It is assumed at this point that both cables are connected to the same voltage source, and at step 122 the difference is stored as a difference offset between the cables. Once calibration is complete, the logo LED is turned on (e.g. pin 6 made high) at step 124, and all red LEDs are turned on (e.g. pins 7 and 8 made high) at step 126, signaling the completion of the calibration to the user. Execution may then end, or may return to Location 13A of FIG. 13 for regular use of the cables.

Figure 17:
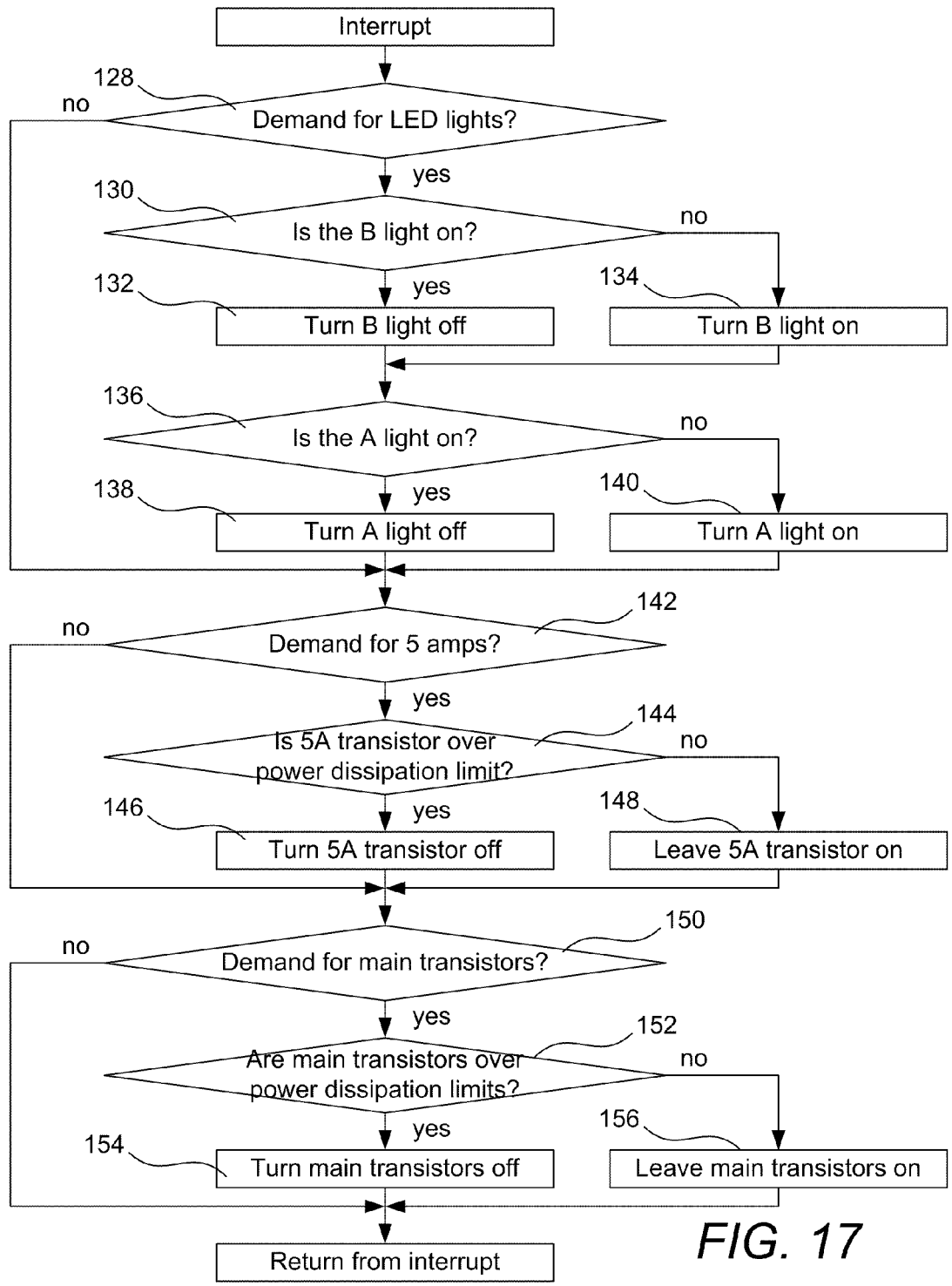

FIG. 17 shows an example interrupt process that may occur at any time during any of the other processes discussed above. For example, the microcontroller 60 may be programmed to run the interrupt process at fixed intervals to monitor conditions of the cables and circuitry. Execution begins with decision block 128, where it is determined whether there is demand for the LED lights (or other signals). If so, execution proceeds to decision block 130, where the microcontroller 60 determines whether the B light (corresponding to one of the cables) is on. If yes, it is turned off at step 130, and if no, it is turned on at step 134. Similarly, at decision block 136, the microcontroller 60 determines whether the A light (corresponding to the other cable) is on. If yes, it is turned off at step 138, and if no, it is turned on at step 140. Execution then proceeds to decision block 142 (where execution also proceeds if there is no demand for the LED lights.

At decision block 142, a determination is made as to whether there is demand for the low-current supply (in this case illustrated as five amps). If yes, execution proceeds to a determination of whether the low-current transistor is over its power dissipation limit (e.g. is in danger of overheating or failing due to heat) at decision block 144. If yes, the low-current transistor is turned off at step 146. If not, the low-current transistor is left on. After the low-current supply check (and change, if any), execution proceeds to decision block 150, where a determination is made as to whether there is demand for the main power transistors. If yes, execution proceeds to a determination of whether the main power transistors are over their power dissipation limits (e.g. in danger of overheating or failing due to heat) at decision block 152. If yes, the main power transistors are turned off at step 154. If not, the main power transistors are left on at step 156. After the main power transistors check, execution returns to whatever point in the process where the interrupt procedure was begun.

Although the processes illustrated in FIGS. 13-17 have been illustrated in particular orders, it should be understood that the order of specific steps and decisions is not always critical. For example, many of the steps and decisions may be taken essentially simultaneously or simultaneously. In addition, in any situation where it is possible to vary the order of steps to an order other than the specifically-illustrated order, it should be understood that such orders are embraced by the embodiments of the invention. Thus the particular ordering of steps illustrated is provided by way of instruction and illustration only, and not by way of limitation.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A safety circuit for use in establishing connections between low-voltage systems to transfer energy from a first low-voltage system to a second low-voltage system, comprising:
    a pair of input terminals;
    a pair of output terminals;
    a detection circuit operatively connected to the input terminals and the output terminals for detecting whether the input terminals and the output terminals are properly connected to first and second low-voltage systems, respectively;
    a connection-controlling circuit configured to electrically connect the input terminals to the output terminals only when a proper connection has been detected and using a soft start procedure that reduces inductive voltage spikes; and
    a transistor protection s stem for protecting transistors used to electrical connect the input terminals to the output terminals, the transistor protection system comprising a microcontroller that maintains a thermal model of heating of the transistors when power is flowing and a thermal model of cooling of the transistors when power is not flowing, that monitors for over-current conditions that could destroy the transistors, and that monitors for under-voltage conditions on the supply side.

2. A safety circuit as recited in claim 1, wherein the connection-controlling circuit controls one or more power transistors that are used to electrically connect the input terminals to the output terminals using the soft start procedure.

3. A safety circuit as recited in claim 2, wherein the soft start procedure connects the first low-voltage system to the second low-voltage system over a period of tens of milliseconds.

4. A safety circuit as recited in claim 1, wherein the safety circuit is incorporated into a jumper cable.

5. A safety circuit as recited in claim 1, wherein the safety circuit is incorporated into a battery charger.

6. A safety circuit as recited in claim 1, wherein the safety circuit is incorporated into a battery boost.

7. A safety circuit as recited in claim 1, further comprising a discharged battery test circuit configured to supply a test current to the output terminals and measure a resulting voltage to determine a proper polarity of a discharged battery connected to the output terminals.

8. A safety circuit as recited in claim 7, wherein the discharged battery test circuit is configured to supply test currents of different directions and to compare the voltages caused by the test currents.

9. A safety circuit as recited in claim 1, wherein the safety circuit is configured to detect whether a battery is connected to one of the pair of input terminals and the pair of output terminals by biasing the desired terminals to a voltage unlikely to occur naturally in one of the low-voltage systems and determining whether the voltage aberrates from the biased voltage by a given amount.

10. A safety circuit as recited in claim 1, wherein the safety circuit is configured to discriminate between a short circuit and a discharged battery by measuring the rise and fall time of a voltage measured across one of the pair of input terminals and the pair of output terminals as a limited current is allowed to flow.

11. A method of testing a polarity of a discharged battery connected to a first low-voltage system comprising:
    connecting a test current source to a first low-voltage system containing a discharged battery;
    supplying a first test current to the first low-voltage system;
    measuring a first resulting voltage of the first low-voltage system;
    supplying a second test current to the first low-voltage system, wherein the second test current is in an opposite direction to the first low-voltage system; and
    measuring a second resulting voltage of the first low-voltage system.

12. A method as recited in claim 11, further comprising making an electrical connection between the first low-voltage system and a second low-voltage system only if the first resulting voltage exceeds a predetermined threshold voltage.

13. A method as recited in claim 11, further comprising making an electrical connection between the first low-voltage system and a second low-voltage system only if only one of the first resulting voltage and the second resulting voltage exceeds a predetermined threshold voltage and if the electrical connection will be of a proper polarity indicated by the measured first and second resulting voltages.

14. A method as recited in claim 11, wherein the method is incorporated as a test method upon connection of a battery charger to a system having a discharged battery.

15. A method as recited in claim 14, wherein the system having a discharged battery is a vehicle.

16. A method as recited in claim 11, wherein the method is incorporated as a test method upon connection of a battery boost to a system having a discharged battery.

17. A method as recited in claim 11, wherein the method is incorporated as a test method upon connection of a jumper cable to a vehicle having a discharged battery.

18. A jumper cable for use in establishing connections between low-voltage systems to transfer energy from a first low-voltage system to a second low-voltage system, comprising:
   a safety circuit comprising:
      a pair of input terminals;
      a pair of output terminals;
      a detection circuit operatively connected to the input terminals and the output terminals for detecting whether the input terminals and the output terminals are properly connected to first and second low-voltage systems, respectively;
      a connection-controlling circuit configured to electrically connect the input terminals to the output terminals only when a proper connection has been detected and using a soft start procedure that reduces inductive voltage spikes; and
      a transistor protection system for protecting transistors used to electrically connect the input terminals to the output terminals, the transistor protection system comprising a microcontroller that maintains a thermal model of heating of the transistors when power is flowing and a thermal model of cooling of the transistors when power is not flowing, that monitors for over-current conditions that could destroy the transistors, and that monitors for under-voltage conditions on the supply side;
   a first cable connected to the input terminals and comprising first contact clamps for connecting to the first low-voltage system; and
   a second cable connected to the output terminals and comprising second contact clamps for connecting to the second low-voltage system.

19. A jumper cable as recited in claim 18, wherein the safety circuit is contained in a control box proximate one of the first contact clamps and the second contact clamps.

20. A jumper cable as recited in claim 19, wherein the control box comprises a plurality of light emitting diodes for signaling conditions detected by the safety circuit to a user of the jumper cable.

* * * * *